March 29, 1955   D. C. WILEY   2,705,021
LIQUID FILLED BELLOWS DIFFERENTIAL PRESSURE INSTRUMENT
Filed Oct. 7, 1953   3 Sheets-Sheet 1
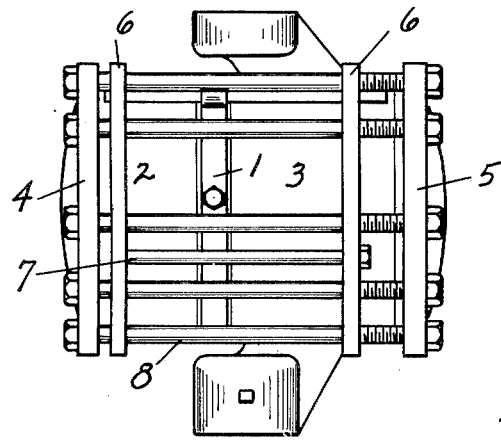
FIG. 1
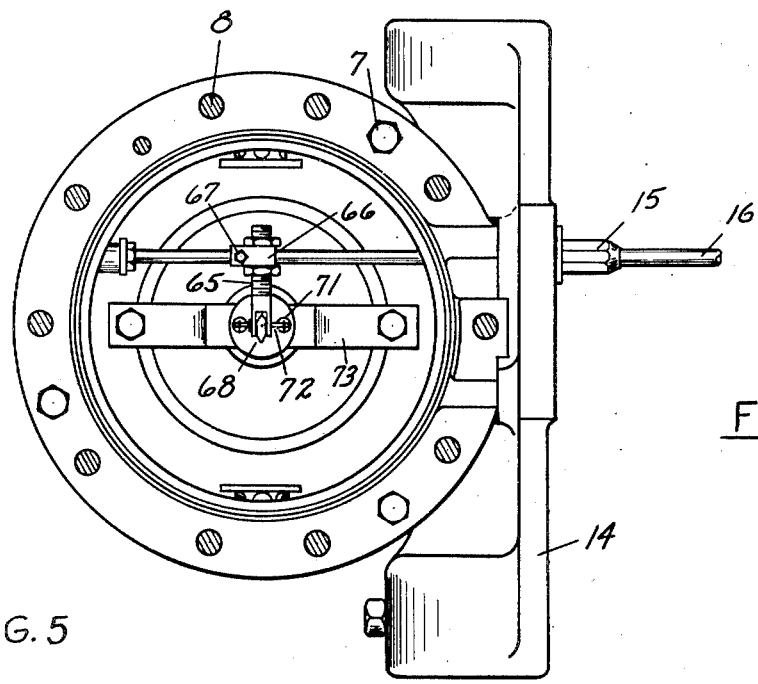
FIG. 3
FIG. 5
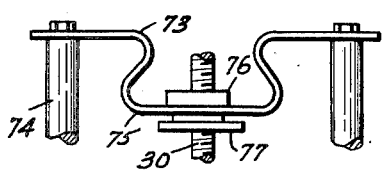
INVENTOR.
Donald C. Wiley
BY
Ralph Hammar
Attorney March 29, 1955  D. C. WILEY  2,705,021
LIQUID FILLED BELLOWS DIFFERENTIAL PRESSURE INSTRUMENT
Filed Oct. 7, 1953  3 Sheets-Sheet 2

INVENTOR.
Donald C. Wiley
BY
Ralph Hammar
Attorney

March 29, 1955     D. C. WILEY     2,705,021
LIQUID FILLED BELLOWS DIFFERENTIAL PRESSURE INSTRUMENT
Filed Oct. 7, 1953     3 Sheets-Sheet 3

INVENTOR.
Donald C. Wiley
BY Ralph Hammar
attorney

United States Patent Office 2,705,021
Patented Mar. 29, 1955

2,705,021

LIQUID FILLED BELLOWS DIFFERENTIAL PRESSURE INSTRUMENT

Donald C. Wiley, Erie, Pa., assignor to American Meter Company, Incorporated, Erie, Pa., a corporation of Delaware Application October 7, 1953, Serial No. 384,750

3 Claims. (Cl. 137—781)

In all pressure instruments of the liquid filled bellows type, elimination of air in the liquid filling is necessary for accuracy, controlled damping of the liquid is necessary to prevent pulsation, an expansion chamber is necessary to accommodate thermal changes in the liquid volume, and calibrating adjustments are necessary to accommodate the bellows deflection to the instrument scale. This invention is intended to meet these requirements in a differential pressure instrument and in addition to provide an instrument in which the service replacement of parts and adjustments can be carried out in the field, without returning the instrument to the factory.

Figure 2:
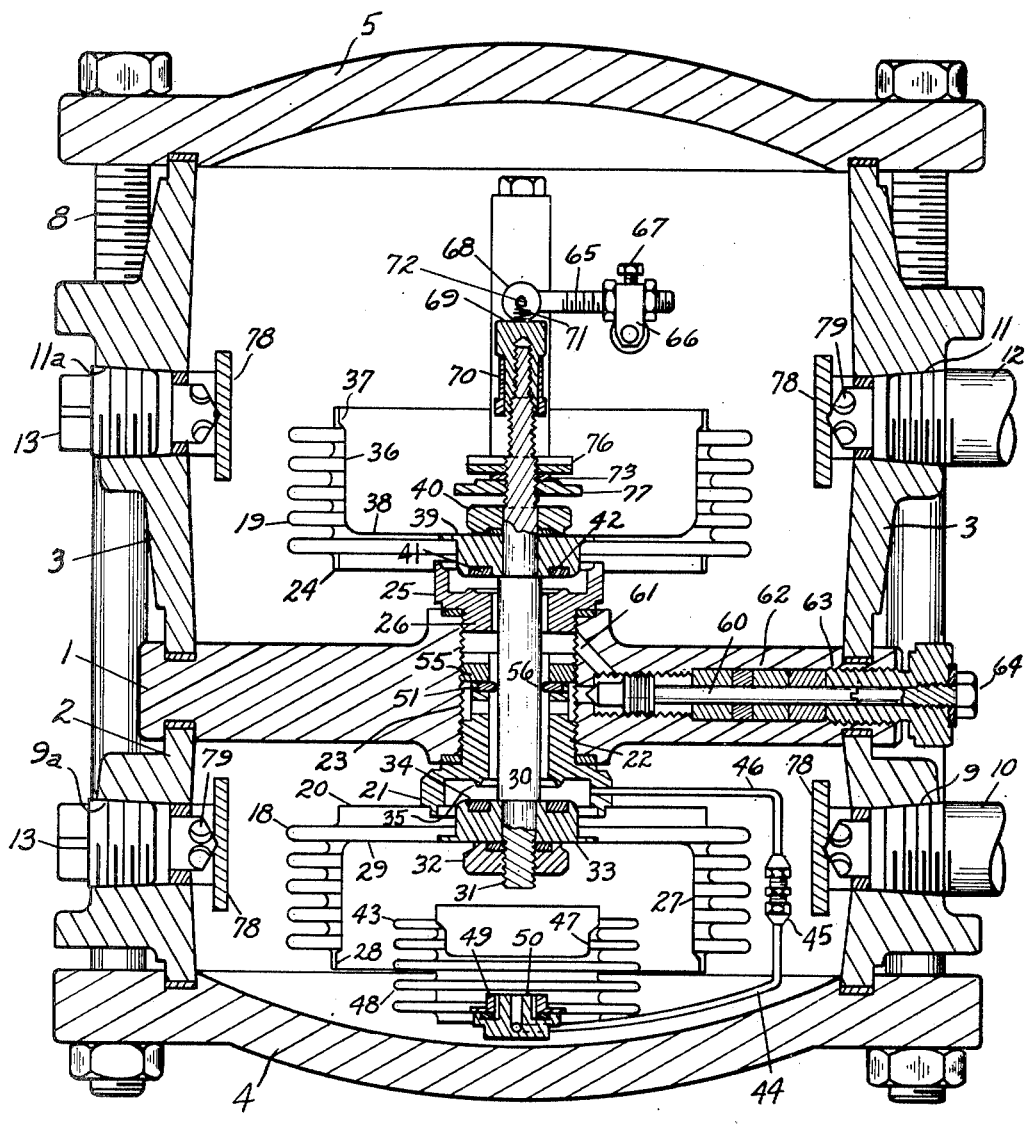
Figure 4:
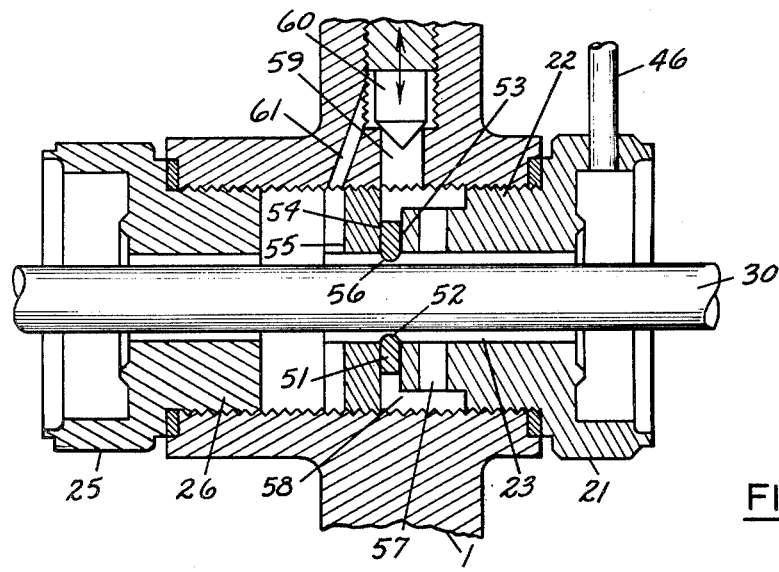
Figure 6:
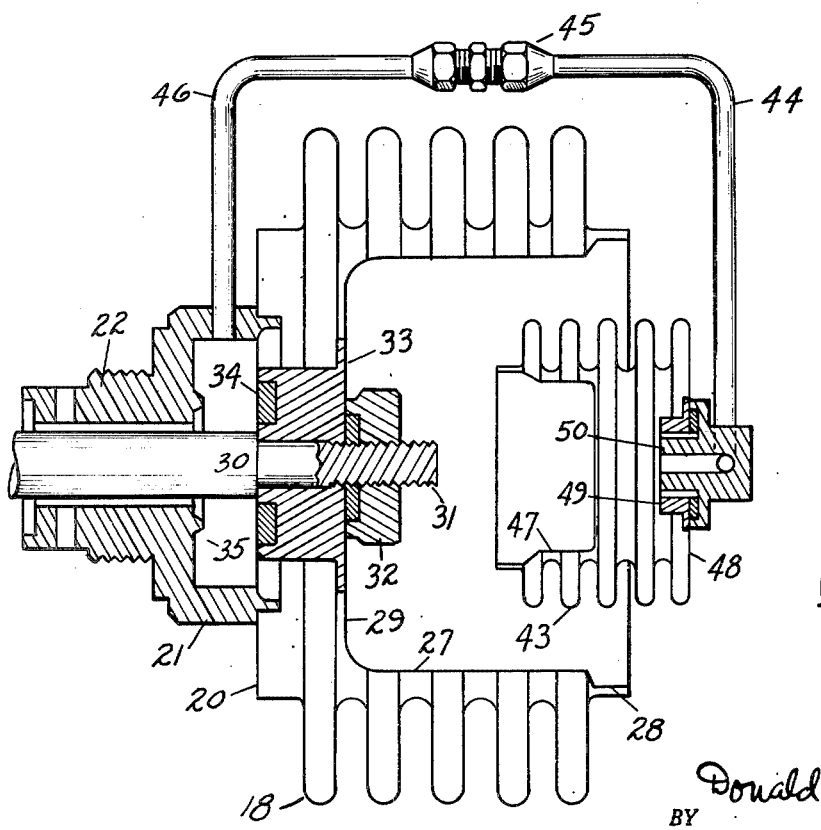

In the drawing, Fig. 1 is a side view of a differential pressure instrument; Fig. 2 is a sectional elevation; Fig. 3 is an end view; Fig. 4 is a detail of the pulsation damping; Fig. 5 is a detail of the instrument range spring; and Fig. 6 is a detail of the temperature expansion bellows.

The instrument housing has a center plate 1 on opposite sides of which are cylindrical casing sections 2 and 3 having the outer ends respectively closed by headers 4 and 5. The cylindrical sections 2 and 3 are provided with flanges 6 by which the cylindrical sections are secured to the center plate by bolts 7. The main securing force holding the casing together is provided by through bolts 8 which extend between the headers 4 and 5 and both clamp the headers to the outer ends of the cylindrical casing sections 2 and 3 and also clamp the cylindrical casing sections to the center plate 1. The cylindrical casing section 2 is provided with a fitting 9 for connection to a high-pressure line 10. The cylindrical casing section 3 is provided with a similar fitting 11 for connection to a low-pressure line 12. Alternative fittings 9a and 11a are provided, which are normally closed by pipe plugs 13. These additional fittings are convenient in making the piping connections to the instrument casing. With this casing construction, either the high-pressure header 4 or the low-pressure header 5 may be removed to provide access to the interior of the casing without disturbing the high and low pressure piping connections to the fittings 9 and 11. When the headers 4 and 5 are removed, the casing sections 2 and 3 are still held in assembled relation to the center plate 1.

The instrument casing is supported by a mounting bracket 14 suitably fastened to the low-pressure cylindrical casing section 3. A stuffing box 15 for the indicator shaft 16 extends out through the mounting bracket. The mounting bracket and stuffing box are or may be of common construction.

Within the high and low pressure chambers 2 and 3 on opposite sides of the center plate 1 are identical bellows 18 and 19. The bellows 18 in the high-pressure chamber 2 has an end wall 20 fixed to a cylindrical extension 21 on a nipple 22 threaded into the high-pressure end of an opening 23 in the center partition 1. The bellows 19 in the low-pressure chamber 3 has a similar end wall 24 fixed to a cylindrical extension 25 on a nipple 26 threaded into the opposite or low-pressure end of the opening 23 in the center partition. When the nipples 22 and 26 are threaded into opposite ends of the opening 23 in the center partition, the end walls 20 and 24 of the high and low pressure bellows 18 and 19 are sealed to opposite sides of the center partition and a fluid interconnection between the bellows is established through the opening 23. The end wall of the high-pressure bellows 18 remote from the center plate 1 is a cup-shaped part 27 having its rim 28 fixed to the outer end of the bellows and its bottom wall 29 adjacent the end wall 20 of the bellows. An "Invar" rod 30 coaxial with the bellows 18 and extending through the center opening 23 in the partition has a threaded extension 31 which extends through the bottom wall 29 of the cup-shaped part 27 and has threaded thereon a sealing nut 32, which clamps the bottom wall 29 against a valve stop member 33. The valve member 33 is of smaller diameter than the bore of the cylindrical extension 21 on the nipple 22 so that as the bellows 18 is compressed by an excess of pressure in the high-pressure chamber 2, the valve member 33 freely moves within the cylindrical extension 21 until a flat annular sealing washer 34 carried by the valve member engages a sealing rib 35 on the nipple 22. Upon engagement of the valve member 23 with the nipple 22, not only is further compression of the high-pressure bellows 18 stopped, but a seal is effected between the rib 34 and the sealing washer 35, which traps the liquid contained within the high-pressure bellows. The low-pressure bellows 19, which is of the same size as the high-pressure bellows 18, has an identical cup-shaped member 36 having its rim 37 fastened to the end of the bellows 19 remote from the center plate 1 and having its bottom wall 38 clamped between a valve stop member 39 and a nut 40 threaded on the opposite end of the rod 30. The valve stop member 39 is of the same construction as the valve stop member 33 and carries a sealing washer 41 which makes sealing engagement with an annular rib 42 at the bottom of the cylindrical extension 25 on the nipple 26 limiting the compression of the low-pressure bellows 19.

The high and low pressure bellows 18 and 19 are closely matched in area and other dimensions so as to have substantially identical characteristics. The bellows and the connecting passageway through the center plate 1 are entirely filled with an incompressible liquid (the incompressible liquid fill being old in differential pressure devices made under Patent 2,082,325, Cross) which has a fluid pressure throughout the operating range of the instrument equal to the average of the pressures in the high and low pressure chambers 2 and 3. Within the operating range of the instrument, the maximum difference between the high and low pressures is relatively small, e. g. 100 inches of water, and the pressure on the outside of each bellows differs from the inside pressure by a maximum of 50 inches of water. In other words, the stress on the bellows is not proportional to the high or low pressures which may be quite high but is proportional to the relatively small difference between the high and low pressures.

As in all bellows type pressure instruments, some protection must be provided against over pressure. The bellows are designed for a limited deflection and when this deflection is reached, further deflection is prevented most commonly by a check valve shutting off the pressure which causes the deflection, although other expedients such as pressure relief valves have been used. No matter which expedient is used, the result is to remove or disable the pressure when the bellows reaches the maximum deflection for which it is designed. A simple way of protecting bellows from excessive deflection which has long been used in bellows pressure instruments (see U. S. Patents 1,239,565, Collinson; 1,278,761, Schneider; 1,898,257, Nelson; 2,058,858, Fetyko. Also, see U. S. Patents 1,170,195, Sheldon; 1,592,415, Bristol; 1,725,559, Winton; and 1,888,424, Diehl, where equivalent check valves are provided in mercury manometers) is by a valve stem fixed to the bellows located in the pressure supply passageway to the interior of the bellows. Within the operating range, the valve stem freely moves in the passageway and does not interfere with the pressure supply. However, when the maximum deflection of the bellows is reached, a valve member on the stem seals against a seat and cuts off the pressure supply thereby preventing further deflection.

In the present instrument, there are two bellows to be protected against over-range deflection, but the principle is the same as in a single bellows instrument. The most common condition to be guarded against in differential pressure instruments is the sudden removal of either the high or the low pressure. When the low pressure is removed, the high pressure acting on the bellows 18 tries to force the liquid fill into the low pressure bellows 19 and, since there is now no opposing force from the low pressure, would rupture the low pressure bellows unless the flow of liquid into the low pressure bellows is cut off. Similarly, if the high pressure is suddenly removed, the low pressure acting on the bellows 19 tries to force the liquid fill into the high pressure bellows 18 and would rupture the high pressure bellows unless the flow of liquid into the high pressure bellows is cut off. In the present instrument, if for any reason either the high or low pressure should be removed while the other pressure remained, the bellows would move until the check valves 33 or 39 came up against the sealing ribs 35 or 42, thereby limiting the excursion of the bellows and preventing rupture. For example, if the low pressure were suddenly removed from the chamber 3, the check valve member 33 would be moved by the high pressure up against the sealing rib 35 and thereafter no more liquid could flow from the high-pressure bellows 18 into the low-pressure bellows 19. In this condition, the high-pressure bellows 18 cannot be injured, because the liquid fill remaining within the high-pressure bellows will counterbalance the high-pressure exerted on the outside of the bellows. Neither can the low-pressure bellows 19 be injured, because the liquid then within the low-pressure bellows is incompressible and accordingly cannot expand so as to injure the low-pressure bellows.

Because the bellows 18 and 19 are closely matched and are tied together by the tie-rod 30 so that they must deflect in unison, the internal volume of the bellows 18 and 19 is constant in all positions of the bellows. However, the liquid filling the bellows expands and contracts with temperature changes and accordingly some arrangement must be provided for accommodating the thermal changes in the volume of the liquid to eliminate stresses in the bellows. This problem has been encountered in liquid filled bellows instruments and has been solved by auxiliary bellows serving as an expansion chamber for the liquid fill (see for example U. S. Patents 1,543,061, Danielson, and 1,749,419, De Giers). In the present instrument, the expansion chamber consists of a bellows 43 nested within the cup-shaped end wall 27 of the high-pressure bellows 18. The bellows 43 is connected through a fluid line 44 and a coupling 45 to a fluid line 46 branching from the cylindrical extension 21 on the nipple 22. The expansion bellows 43 has a cup-shaped end wall 47 presented to the sealing nut 32 at the bottom of the cup-shaped end wall 27 of the high-pressure bellows 18. The cup-shaped wall 47 provides clearance for deflection of the end wall 27 of the high-pressure bellows, which is necessary because the expansion or temperature compensating bellows 47 is mounted on the nipple 22 which is fixed to the center plate 1. The opposite end wall 48 of the temperature expansion bellows 43 has fixed at its center a nut 49 into which is threaded a nipple 50 carrying the line 44. When the nipple 50 is threaded into the nut 49, the line 44 is sealed and a fluid tight connection is made to the interior of the temperature compensating bellows 43. The temperature expansion bellows 43 does not affect the operation of the instrument. It merely serves as the conventional expansion chamber accommodating thermal changes in the volume of the liquid filling the bellows 18 and 19.

Because the tie-rod 30 is of a zero temperature coefficient material such as "Invar," there is no thermal expansion of the rod which could affect the accuracy of the instrument by causing movement of the bellows under temperature changes. The zero temperature coefficient rod compensates for thermal expansion of the metal.

For friction-free operation, there must be a substantial clearance between the tie-rod 30 and the bore of the nipples 22 and 26 through which the tie-rod extends. This prevents binding in case the thin-walled bellows 18 and 19 should for any reason be out of precise alignment. While the larger clearance between the tie-rod 30 and the nipples 22 and 26 is satisfactory when the differential pressures to be measured are free from pulsations, the clearance is objectionable when the pressures are pulsating. With the large clearance, the bellows would try to follow the pulsations and the resultant differential pressure would be subject to wide excursions. This problem has heretofore arisen in pressure responsive devices of the liquid filled bellows type and has been cured by the provision of damping restrictions offering resistance to the fluid flow so that the bellows cannot respond to the pulsations in the pressure, but rather respond to the mean or average pressure (see for example U. S. Patents 1,832,380, Goldman; 1,898,257, Nelson; 1,939,509, McClelland; 2,147,031, Hastings et al; and 2,573,522, Watt). In the present instrument, the pulsation damper comprises a washer 51 of smaller outside diameter than the opening 23 in the center plate 1 and having an inside diameter or bore 52 of the order of .005 of an inch larger than the outside diameter of the tie-rod 30. See Figs. 2 and 4. The .005 of an inch clearance between the bore of the washer 51 and the tie-rod 30 provides sufficient damping restriction to accommodate the largest pulsations in the differential pressure likely to be encountered. The washer 51 is loose on the tie-rod 30 and is confined between an end wall surface 53 on the nipple 22 and an end wall 54 on a spacer 55 threaded into the opening 23. The walls 53 and 54 are in sliding engagement with the ends of the washer 51 so that the washer can move transverse to the tie-rod 30 and thereby accommodate itself to any position the tie-rod might assume, if the bellows 18 and 19 were out of alignment. Since the washer 51 is quite thin, there might be some tendency for the washer to grip the tie-rod and interfere with the movement of the rod necessary to respond to the differential pressure. This cramping is prevented by a slight rounding of the edges of the bore 52 of the washer indicated at 56 on the drawing. With this construction, the damping clearance between the washer 51 and the tie-rod is essentially independent of the position of the tie-rod and is substantially unaffected by any leakage which may take place between the ends of the washer 51 and the walls 53 and 54. From one aspect, the walls 53 and 54 which are in sliding engagement with the ends of the washer provide floating mounting for the washer which accommodates misalignment of the tie-rod 53 without in any way interfering with the damping restriction between the bore of the washer and the tie-rod. While the damping restriction provided by the washer 51 is needed when the pressure is subject to extreme pulsation it is not needed, and, in fact, is detrimental when the differential pressures are more nearly steady. The damping restriction interferes with the sensitivity of response of the instrument and while this decrease in sensitivity is necessary under extreme pulsation, it is not necessary for the more nearly constant or steady pressures. For this reason, a controlled bypass is provided around the washer 51. See Figs. 2 and 4. The bypass passageway comprises radial holes 57 drilled through the reduced inner end 58 of the nipple 22, a way 59 drilled in the center plate 1 and having its inner end communicating with the space surrounding the end 58 of the nipple and having its outer end restricted by a needle valve 60, and a way 61 leading from the needle valve controlled way 59 to the other side of the spacer 55. The needle valve 60 has packing 62 preventing leakage and has a screw-driver slot 63 by which the degree of restriction may be adjusted. Access to the screwdriver slot is obtained by removing a sealing cap screw 64. When the cap screw is removed, the needle valve 60 may be readily adjusted under full working pressure. This permits accurate adjustment of the damping restriction under actual operating conditions.

The tie-rod 30 interconnecting the high and low pressure bellows 18 and 19 will assume a position dependent upon the difference between the high and low pressures. In order that the movement of the tie-rod 30 may be transmitted to a point where it may be used, either as an indication or to actuate a control, it is necessary that a take-off be provided. That is, there must be some connection between the tie-rod 30 and the shaft 16 to which the pointer 17 is connected. The mechanical take-off interconnecting the tie-rod 30 with the shaft 16 comprises a crank arm 65 adjustably carried in a lug 66 which is locked by a set screw 67 on the shaft 16 so that a wheel 68 at the free end of the crank arm 65 will ride on the flat surface 69 at the end of a sleeve 70 threaded on the tie-rod 30. The wheel 68 is held in contact with the surface 69 by two tension springs 71 at opposite ends of an axle 72 carrying the wheel 68. By adjustment of the sleeve 70, the linear motion of the tie-rod 30 can have a variable relation to the angular motion transmitted to the shaft 16 by the crank arm 65, which may be desirable in accommodating the indication of the instrument to a desired scale. While the force acting on the tie-rod 30 is due to the difference between the high and low pressures, the movement of the tie-rod is resisted by the spring action of the bellows 18 and 19 and by a further spring 73, which is called a range spring, because it adjusts the range of deflection of the instrument over the operating range of differential pressures. The range spring consists of a flat strip spring supported at its ends on posts 74 extending from the center plate and having a re-entrant center section 75 fastened to the tie-rod between two lock nuts 76 and 77. The lock nuts 76 and 77 are for the purpose of selecting the zero adjustment, that is, the setting for zero pressure differential. By varying the position of the lock nuts, the zero setting of the range spring 73 accommodates variation in the stiffness of the bellows 18 and 19. The indication is made independent of temperature by making the tie-rod 30 and the posts 74 of zero temperature coefficient metal (e. g. "Invar") and by making the spring 73 of a spring metal having a positive coefficient of stiffness which offsets or balances out the increase in area of the bellows 18 and 19 due to thermal expansion of the bellows. The rod 30 makes the position of the surface 69 dependent solely upon differential pressures. The posts 74 maintain the spring 73 in fixed relation to the surface 69. The positive coefficient of stiffness of the spring provides additional spring stiffness to offset increase in bellows area with temperature.

The adjustments of the range spring 73 and of the connection between the tie-rod 30 and the shaft 16 are in the nature of calibrating adjustments, which must be made initially and from time to time during the life of any instrument. These adjustments can be made in the field without breaking the connections to the high and low pressure lines 10 and 12, since all the adjustments are accessible when the head 5 on the low-pressure end of the casing 3 is removed.

While it has been suggested that the high and low pressure fittings be led in the sides of the chambers opposite the bellows, this arrangement has not worked out, because particles of scale have been discharged through the high and low pressure lines 10 and 12 and have abraded the side walls of the bellows. This is prevented in the present construction by deflectors 78 permanently mounted in each of the fittings, which prevent direct impingement of the gas streams against the side walls of the bellows. The deflectors 78 have discharge openings 79, which are directed circumferentially around the casing sections 2 and 3.

The accuracy of the instrument depends upon the entire absence of air in the liquid filling the bellows 18, 19, 43 as well as in all the interconnecting lines. While this has heretofore been accomplished by factory methods, it has not been possible to take the bellows apart and refill them while in the field. The present instrument can be taken apart and reassembled while submerged in liquid, thereby permitting field service and replacement of the bellows while eliminating all possibility of trapped air within the liquid fill.

What is claimed as new is:

1. A differential pressure instrument comprising high and low pressure chambers, a liquid filled bellows in each chamber and in axial alignment with each other, means providing a fluid passageway interconnecting the bellows, each of said bellows having an end wall, an axially extending tie-rod fixed to said end walls and extending through the passageway whereby the bellows are constrained to deflect in unison, a washer loose on the tie-rod in said passageway and having a clearance opening through which the rod extends, said clearance opening providing a damping restriction between it and the rod to the fluid flow through the passageway, and a floating mounting for the washer comprising spaced walls transverse to the rod in sliding engagement with opposite ends of the washer and having an opening therein of larger diameter than the clearance opening in the washer and of smaller diameter than the washer, said spaced walls cooperating with the ends of the washer and guiding movement of the washer transverse to the rod to accommodate misalignment of the bellows.

2. A differential pressure instrument comprising high and low pressure chambers separated by a partition having an opening therein, a liquid filled bellows in each chamber and in axial alignment with each other, each bellows having axially spaced end walls, a nipple fixed to the end wall of each bellows adjacent the partition and the nipples in turn being fixed in the opening in the partition whereby the bellows are interconnected through the nipples and the opening in the partition, an axially extending tie-rod fixed to the end walls of the bellows remote from the partition and extending through the nipples and the opening in the partition whereby the bellows are constrained to deflect in unison, a washer loose on the tie-rod in said passageway of smaller outside diameter than the opening in the partition and having a clearance opening through which the rod extends, said clearance opening providing a damping restriction between it and the rod to the fluid flow through the fluid interconnection between the bellows, and means mounted in the opening in the partition providing spaced walls having sliding engagement with opposite ends of the washer and extending transverse to the rod and having an opening therein of larger diameter than the clearance opening in the washer and of smaller diameter than the washer, said spaced walls cooperating with the ends of the washer and guiding movement of the washer transverse to the rod to accommodate misalignment of the bellows.

3. A differential pressure instrument comprising high and low pressure chambers separated by a partition having an opening therein, a liquid filled bellows in each chamber and in axial alignment with each other, a nipple fixed to each bellows and the nipples in turn being fixed in said opening in the partition and respectively on opposite sides of the partition, each of said bellows having an end wall remote from the partition, an axially extending tie-rod fixed to said end walls and extending through the opening in the partition whereby the bellows are constrained to deflect in unison under differential pressure, said tie-rod being of zero temperature coefficient metal whereby the ends of the tie-rod assume a position independent of temperature, a leaf spring engaging one end of the tie-rod and resisting movement of the rod, said spring being of metal having a positive temperature coefficient of stiffness whereby the increase in stiffness of the spring offsets the increased force of the bellows due to the increase in area of the bellows from thermal expansion, and a support for the spring of zero temperature coefficient metal whereby the position of the spring relative to the rod is unaffected by temperature, and means for transmitting the motion of said one end of the rod.

References Cited in the file of this patent

UNITED STATES PATENTS

| 1,198,134 | Kercher | Sept. 12, 1916 |
| 1,705,622 | Mallory | Mar. 19, 1929 |
| 2,524,446 | Johnson | Oct. 3, 1950 |
| 2,547,367 | Booth | Apr. 3, 1951 |
| 2,590,324 | Jones | Mar. 25, 1952 |